United States Patent
Wycech

(10) Patent No.: US 6,341,467 B1
(45) Date of Patent: *Jan. 29, 2002

(54) INTERNAL REINFORCEMENT FOR HOLLOW STRUCTURAL ELEMENTS

(75) Inventor: Joseph S. Wycech, Grosse Pointe Shores, MI (US)

(73) Assignee: Henkel Corporation, Gulph Mills, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/440,746

(22) Filed: Nov. 16, 1999

Related U.S. Application Data

(63) Continuation-in-part of application No. 08/914,481, filed on Aug. 19, 1997, which is a continuation of application No. 08/644,389, filed on May 10, 1996, now abandoned.

(51) Int. Cl.$^7$ .................................................. E04C 3/30
(52) U.S. Cl. .................... 52/721.4; 52/729.1; 52/735.1; 52/795.1
(58) Field of Search ..................... 52/735.1, 736.1, 52/729.1, 721.4, 732.1, 790.1, 795.1

(56) References Cited

U.S. PATENT DOCUMENTS

| 918,643 A | 4/1909 | Banks |
| 3,516,213 A | 6/1970 | Sauer .......................... 52/725 |
| 3,865,914 A | 2/1975 | Nahr ......................... 264/46.5 |
| 4,019,301 A | 4/1977 | Fox ............................... 52/725 |
| 4,616,453 A | 10/1986 | Sheppard, Jr. et al. ........... 52/93 |
| 4,751,249 A | 6/1988 | Wycech ........................ 521/54 |
| 4,901,500 A | 2/1990 | Wycech ....................... 296/146 |
| 4,908,930 A | 3/1990 | Wycech ........................ 29/828 |
| 4,978,562 A | 12/1990 | Wycech ...................... 528/35.8 |
| 5,194,199 A | 3/1993 | Thum |
| 5,344,208 A | 9/1994 | Bien et al. ................... 296/187 |
| 5,575,526 A | 11/1996 | Wycech |
| 5,755,486 A | 5/1998 | Wycech |
| 5,766,719 A | 6/1998 | Rimkus ........................ 428/71 |
| 6,092,864 A | 1/1999 | Wycech et al. ............. 296/204 |
| 5,884,960 A | 3/1999 | Wycech ................... 296/146.6 |
| 5,888,600 A | 3/1999 | Wycech ...................... 428/35.9 |
| 6,003,274 A | 12/1999 | Wycech ........................ 52/232 |
| 6,058,673 A | * 5/2000 | Wycech ...................... 52/721.4 |
| 6,068,424 A | 5/2000 | Wycech ...................... 403/269 |
| 6,096,403 A | 8/2000 | Wycech ...................... 428/122 |

FOREIGN PATENT DOCUMENTS

| DE | 3943333 | 7/1991 |
| EP | 0583663 | 7/1993 |
| FR | 2749263 | 12/1997 |
| GB | 1413016 | 5/1975 |
| GB | 2082235 | 3/1982 |
| JP | 03118179 | 12/1991 |
| JP | 3-118179 | 12/1991 |
| JP | 7-31569 | 6/1995 |
| JP | 07031569 | 6/1995 |

OTHER PUBLICATIONS

Novamax product brochure, Sep. 1996.

* cited by examiner

*Primary Examiner*—Carl D. Friedman
*Assistant Examiner*—Patrick J. Chavez
(74) *Attorney, Agent, or Firm*—Wayne C. Jaeschke; Stephen D. Harper; Harold Pezzner

(57) ABSTRACT

A reinforced beam has an internal I-beam structure with opposed adhesive foam layers. The foam layers are extruded, cut to length and placed on opposed surfaces of the I-beam. When the reinforced beam is heated. The adhesive layers expand to secure the I-beam in place.

58 Claims, 3 Drawing Sheets

INTERNAL REINFORCEMENT FOR HOLLOW STRUCTURAL ELEMENTS

CROSS-REFERENCE TO RELATED APPLICATIONS

This application is a continuation in part of application Ser. No. 08/914,481, filed Aug. 19, 1997 which is a continuation of application Ser. No. 08/644,389 filed May 10, 1996 now abandoned.

TECHNICAL FIELD

The present invention relates generally to reinforced structures for use in motor vehicles and, more specifically, relates to lightweight structures for reinforcing hollow structural elements.

BACKGROUND OF THE INVENTION

In a number of applications in the automotive industry, high-strength structural members with low mass are required. Various composite materials have been proposed in the past as structural members such as exotic light-weight alloys. In most applications, however, mass reduction must not be at the expense of strength and must be balanced against the cost of the product to the consumer. Thus there is a need for maintaining or more preferably for increasing the strength of structural members without significantly increasing materials and labor costs.

The reinforcement of motor vehicle structural members through the use of composite materials is also known. For example the present inventor has disclosed a number of metal/plastic composite structures for use in reinforcing motor vehicles; components. In U.S. Pat. No. 4,901,500 entitled "Lightweight Composite Beam" a reinforcing beam for a vehicle door is disclosed which comprises an open channel-shaped metal member having a longitudinal cavity which is filled with a thermoset or thermoplastic resin-based material. In U.S. Pat. No. 4,908,930 entitled "Method of Making a Torsion Bar" a hollow torsion bar reinforced by a mixture of resin with filler is described. The tube is cut to length and charged with a resin-based material.

In U.S. Pat. No. 4,751,249 entitled "Reinforcement Insert for a Structural Member with Method of Making and Using the Same" a precast reinforcement insert for structural members is provided which is formed of a plurality of pellets containing a thermoset resin with a blowing agent. The precast member is expanded and cured in place in the structural member. In U.S. Pat. No. 4,978,562, entitled "Composite Tubular Door Beam Reinforced with a Syntactic Foam Core Localized at the Mid Span of the Tube" a composite door beam is described which has a resin-based core that occupies not more than one-third of the bore of a metal tube.

In U.S. Pat. No. 4,019,301 entitled "Corrosion-Resistant Encasement For Structural Members" a piling or other structure is disclosed in which an I-beam is encased in a housing into which a resin is poured.

In U.S. Pat. No. 5,575,526 entitled "Composite Laminate Beam for Automotive Body Construction," a hollow laminate beam characterized by high stiffness-to-mass ratio and having an outer portion which is separated from an inner tube by a thin layer of structural foam is described. In U.S. Pat. No. 5,755,486 entitled "Composite Structural Reinforcement Member," a W-shaped carrier insert reinforcement which carries a foam body is described for use in reinforcing a hollow beam.

In addition a number of metal laminates constructions are known in which that metal plates are bonded together by an intervening layer of resin. It is also known to form a metal laminate sheet for use as a floor panel member which comprises a pair of flat metal sheets having an intervening layer of asphalt or elastic polymer.

Although filling the entirety of a section with plastic foam does significantly increase section stiffness (at least when high-density foams are utilized), they also increase mass and thus part weight which, as stated is an undesirable feature in automotive applications. Moreover, although increasing the metal gauge of a section or adding localized metal reinforcements will increase stiffness, as the metal thickness increases, it is more difficult to form the part due to limitations of metal forming machines. Importantly, in many applications increasing metal gauge will not work effectively because mass and stiffness are increased proportionately, with no resultant change in the dynamic stiffness frequency of the part.

Finally, filling a section entirely with foam may be prohibitively expensive, creates a large heat sink and requires elaborate sealing operations to close access holes in the stampings.

Accordingly, it would be desirable to provide a low-cost technique for reinforcing a hollow structural member without proportionately increasing the mass. The present invention provides sections which have increased strength with only moderate increases in mass and without the use of high volumes of expensive resins. In many applications, the present invention reduces vibrations which cause unwanted 'shake' of a component which is primarily subjected to bending rather than torsion.

SUMMARY OF THE INVENTION

In one aspect the present invention provides a reinforced structural member for automotive applications. The reinforced structure is a hollow beam such as a rail section or the like having a pair of opposed inner surfaces. The hollow beam is reinforced through the use of a specially formed insert. The insert is a beam (preferably linear) having two opposed plates which substantially span the width of the cavity defined by the walls of the hollow structural member. The opposed plates preferably have generally planar surfaces. A layer of thermally expandable foam with adhesive properties is bonded to each of these planar surfaces. The insert is placed in the cavity of the hollow structural member such that the adhesive layers are adjacent the opposed inner surfaces of the hollow beam. The beam with the reinforcing insert is then heated to thermally activate the expandable adhesive layers. As the adhesive layers expand they bond securely to the inner surfaces of the hollow beam to form an integral structure, i.e. a structurally reinforced beam.

In one aspect the reinforcing insert of the present invention is wholly enclosed in the hollow structural member. In that aspect the insert is dropped into an open channel which is then closed with a top plate.

In one aspect the reinforcing insert of the present invention is an I-beam which is formed of metal, glass filled nylon or a cementitious material that contains microspheres.

Thus, in accordance with the present invention there is provided in one aspect a reinforced structural member, comprising a structural member defining a space, the structural member having two opposed walls; a reinforcing beam disposed in the space, the reinforcing beam having two opposed plates, each of the plates having a principal surface the plates being separated by a predetermined distance with the principal surfaces being approximately parallel to one another and the plates being interconnected by an interconnecting structural spacing element; a first thermally expanded adhesive body disposed on one of the principal surfaces and a second thermally expanded adhesive body disposed on another of the principal surfaces; and the first thermally expanded adhesive body being bonded to one of the walls of the structural member and the second thermally expanded adhesive body being bonded to another of the walls of the structural members.

These and other advantages and objects of the present invention will now be more fully described with reference to the drawings.

DETAILED DESCRIPTION OF THE PREFERRED EMBODIMENTS OF THE INVENTION

Figure 1:
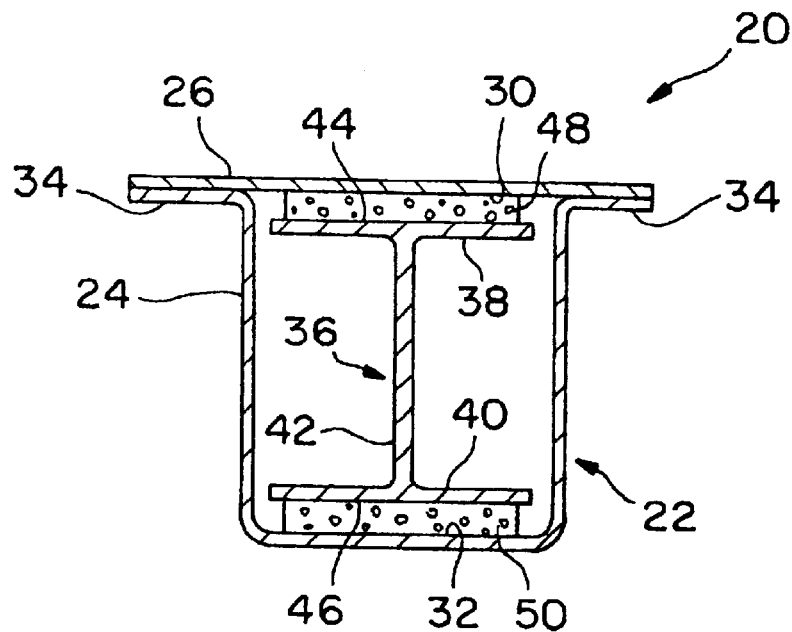
FIG. 1 is a cross section of a reinforced beam in accordance with the present invention in which the reinforcing insert has an I-beam configuration.

Referring now to FIG. 1 of the drawings reinforced beam 20 is shown generally having hollow beam or structure 22 which will typically be a metal stamping for example a rail section of a motor vehicle frame. Accordingly, hollow beam 22 comprises a linear channel section 24 having metal top plate 26. For the purposes of this description hollow beam 22 will be referred to as having top surface or area 30 and bottom surface or area 32, but it is to be understood that the references to top and bottom are arbitrary and will depend on the geometry and orientation of the finished assembly. Top plate will generally be attached to section 24 at flanges 34 by spot welding or the like.

The advantages of the present invention are achieved through the use of a specialized reinforcement member which comprises reinforcing insert in this case I-beam 36 having a pair of opposed plates or spaced carrier members 38 and 40 which are connected by a spanning or spacer portion, web 42. Each plate has an associated principal surface shown here as principal surfaces 44 and 46. On each principal surface 44 and 46 a layer of thermally expanded adhesive foam 48 and 50 is disposed which functions both as a means for securing I-beam 36 in place and as a vibration dampening element. Although I-beam 36 may be straight, in many applications it may have various bends and slopes to match the geometry of the part which is being reinforced. The I-beam 36 may or may not be corrosion resistant depending on its end use.

A number of resin-based compositions can be utilized to form adhesive foam layers 48 and 50 in the present invention. The preferred compositions impart excellent strength stiffness, and vibration dampening characteristics to beam 20 while adding only marginally to the weight. With specific reference now to the composition of adhesive foam layers 48 and 50, the density of the material should preferably be from about 20 pounds per cubic feet to about 40 pounds per cubic feet to minimize weight. The melting point, heat distortion temperature and the temperature at which chemical breakdown occurs must also be sufficiently high such that layers 48 and 50 substantially maintain their structure at high temperatures typically encountered in paint ovens and the like. Therefore adhesive foam layers 48 and 50 layers should be able to withstand temperatures in excess of 400 degrees F. and preferably 350 degrees F. for short times. Also, adhesive foam layers 48 and 50 should be able to withstand heats of about 130 degrees F. to 210 degrees F. for extended periods without exhibiting substantial heat-induced distortion or degradation.

In more detail, in one particularly preferred embodiment adhesive foam layers 48 and 50 includes a synthetic resin, a cell-forming agent and a filler. A synthetic resin comprises from about 50% to about 80% by weight preferably from about 55 percent to about 70 percent by weight, and most preferably from about 55 percent to about 65 percent by weight of the material from which adhesive layers 48 and 50 are formed. As used herein, the term "cell-forming agent" refers generally to agents which produce bubbles, pores, or cavities in layers 48 and 50. That is, layers 48 and 50 have a cellular structure, having numerous cells disposed throughout their mass. This cellular structure provides a low-density, high-strength material, which in reinforced beam 20, provides a strong, yet lightweight structure. Cell-forming agents which are compatible with the present invention include reinforcing hollow microspheres or microbubbles which may be formed of either glass or plastic. Plastic microspheres may be either thermosetting or thermoplastic and either expanded or unexpanded. In one embodiment, unexpanded microspheres are used which are then expanded to form adhesive foam layers 48 and 50. The preferred microspheres are from about 10 to about 400 and preferably from about 40 to about 100 microns in diameter. The cell-forming agent may also comprise a larger, lightweight material such as macrospheres of greater than 400 microns in diameter. Also the cell-forming agent may comprise a blowing agent which may be either a chemical blowing agent or a physical blowing agent. Glass microspheres are particularly preferred. Where the cell-forming agent comprises microspheres it constitutes from about 10 percent to about 40 percent by weight, preferably from about 15 percent to about 40 percent by weight and most preferably from about 25 percent to about 40 percent by weight of the material which forms layers 48 and 50. Where the cell-forming agent comprises a blowing agent, it constitutes from about 1 percent to about 10 percent by weight, preferably from about 1 percent to about 8 percent by weight, and most preferably from about 1 percent to about 5 percent by weight of layers 48 and 50. Suitable fillers include glass or plastic microspheres, silica fume, calcium carbonate, milled glass fiber, and chopped glass strand. Glass microspheres are particularly preferred. Other materials may be suitable. A filler comprises from about 10 percent to about 50 percent by weight, preferably from about 15 percent to about 45 percent by weight and most preferably from about 20 percent to about 40 percent by weight of layers 48 and 50.

Preferred synthetic resins for use in the present invention include thermosets such as epoxy resins, vinyl ester resins, thermoset polyester resins, and urethane resins. It is not intended that the scope of the present invention be limited by molecular weight of the resin and suitable weights will be understood by those skilled in the art based on the present disclosure. Where the resin component of the liquid filler material is a thermoset resin, various accelerators, such as 2 ethyl 4 methyl imidazole, and benzyldimethylamine, and curing agents, preferably organic curing agents such as dicyandiamide and low concentrations of amines or imidizoles may also be included to enhance the cure rate. A functional amount of accelerator is typically from about 5 percent to about 3 percent of the resin weight with corresponding reduction in one of the three components resin, cell-forming agent or filler. Similarly the amount of curing agent used is typically from about 1 percent to about 8 percent of the resin weight with a corresponding reduction in one of the three components, resin, cell-forming agent or filler. Effective amounts of processing aids, stabilizers, colorants, UV absorbers and the like may also be included in layer. Thermoplastics and chemically cured adhesives may be suitable.

In the following tables, preferred formulations for adhesive foam layers 48 and 50. It has been found that these formulations provide a layers 48 and 50 which result in a reinforced beam 20 having excellent structural properties. All percentages in the present disclosure are percent by weight unless otherwise specifically designated.

| INGREDIENT | PERCENTAGE BY WEIGHT |
|---|---|
| FORMULA 1 | |
| PEP 6134 | 68.5 |
| EMI-24 | 1.2 |
| Fumed Silica | 4.0 |
| DI-CY | 4.3 |
| Celogen OT | 0.8 |
| B38 | 22.2 |
| FORMULA II | |
| PEP 6134 | 60.5 |
| DI-CY | 4.8 |
| DMP30 | 1.2 |
| Celogen AZ | 1.5 |
| B38 | 32.0 |

Figure 2:
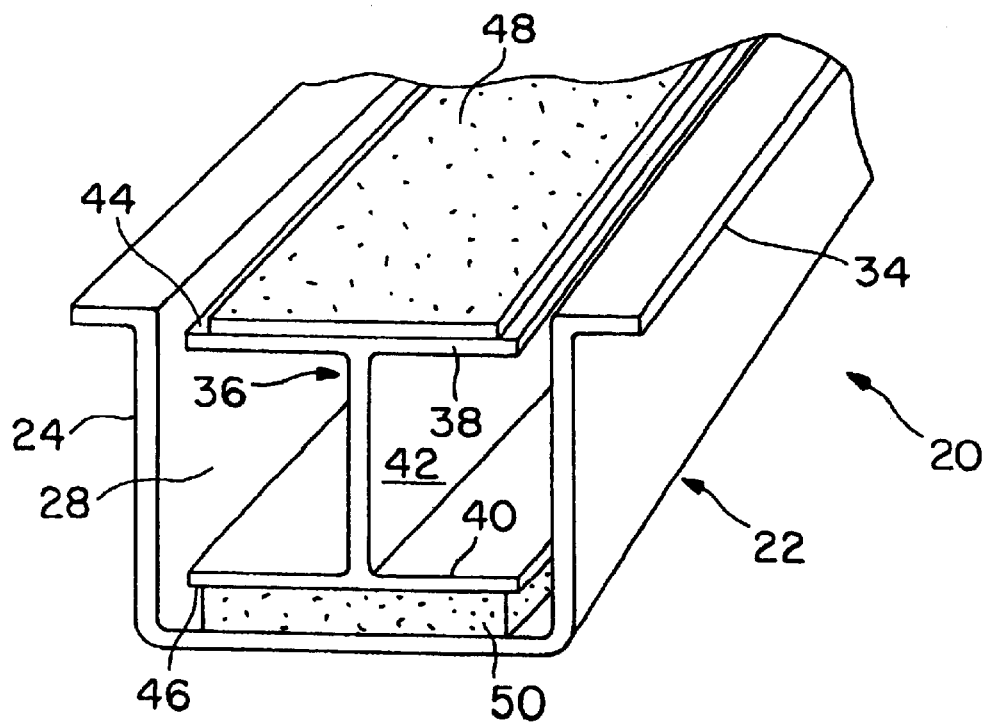
FIG. 2 is a perspective view of the reinforced beam of FIG. I with the top plate removed to reveal the insert beam.

Referring again to FIGS. 1 and 2 of the drawings, foam layers 48 and 50 preferably cover substantially the entirety of principal surfaces 44 and 46, for example at least 80% thereof and most preferable are limited to principal surfaces 44 and 46 i.e. in the most preferred embodiment layers 48 and 50 do not extend beyond the edges of principal surfaces 48 and 50. In some applications, however, it may be desirable to cover less than 80% of principal surfaces 44 and 46 with foam layers 48 and 50 or to extend them beyond the edges of principal surfaces 48 and 50. As shown in FIGS. 1 and 2, I-beam 36 is a unitary structure which may be roll formed steel or which may comprise extruded aluminum, or in one preferred embodiment, glass filled nylon. Other materials may be suitable in a given application. Although it is not intended to limit the full scope of the resent invention by any specific dimensions, the thickness of the walls of I beam 36 will typically be from about 0.8 to about 1.0 mm. The length of interconnecting web 42 will typically be about 1 in. to about 1 ft., and the width of principal surfaces 44 and 46 will each be about 5 in. to about 10 ft. The length of I-beam 36 will typically be from about 6 in to about 10 ft. The thickness of each layer 48 and 50 is preferably from about 3 to about 6 mm as fully expanded. This represents an expansion of the material as reinforced beam 20 is heated of about 50 to about 100 percent by volume. It is preferred that the edges of plates 38 and 40 be spaced apart from the inner sidewalls of section 24 by about 5 to about 8 mm.

Adhesive layers 48 and 50 are most preferably pre-formed as ribbons or sheets by extrusion of the preferred resin-based mixture through an appropriate die. The ribbon is then cut to length such that pieces are formed that fit on principal surfaces 44 and 48. The pre-cut strips have sufficient tack to adhere well to principal surfaces 44 and 46 so that an additional adhesive is generally not necessary.

Figure 3:
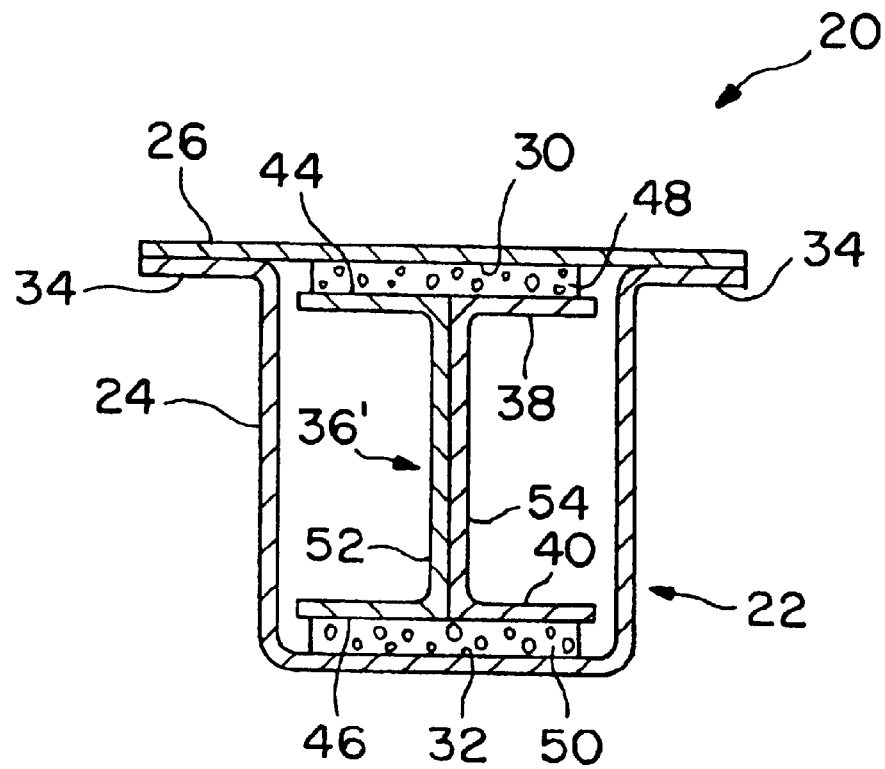
FIG. 3 is a cross section of a reinforced beam in accordance with the present invention in which the reinforcing insert has an I-beam configuration wherein the I-beam is constructed of two mating sections.

Referring now to FIG. 3 of the drawings, I-beam 36' is shown as comprising to separated squared C shaped channel pieces 52 and 54. Channel pieces 52 and 54 may be extruded aluminum, glass tilled nylon or stamped or roll formed steel. Channel pieces 52 and 54 may be attached together as shown in the drawing by a number methods for example spot welding or the like. Other than the two-piece construction of I-beam 36', the reinforced beam of FIG. 3 is essentially identical to the structure described in connection with FIGS. 1 and 2 and accordingly, like reference numerals designate like parts.

Figure 4:
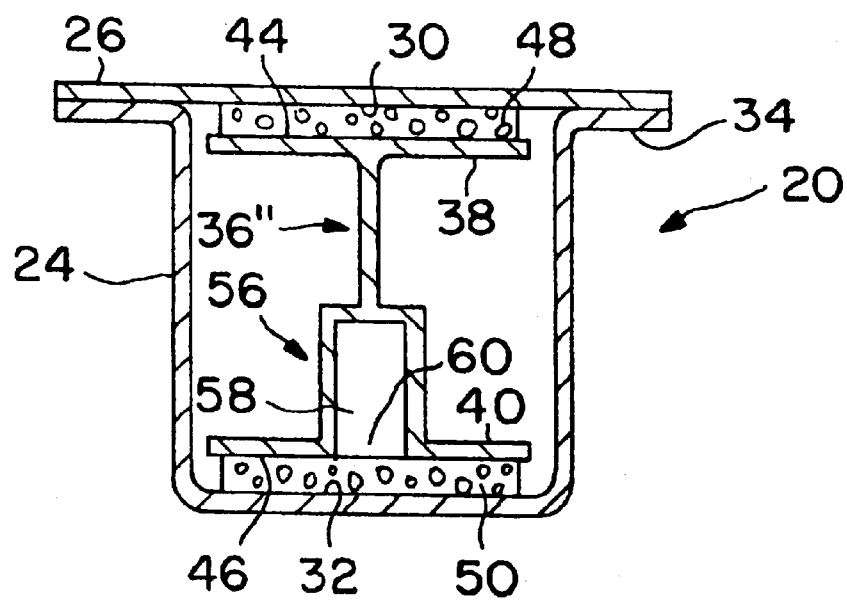
FIG. 4 is a cross section of a reinforced beam in accordance with the present invention in which the reinforcing insert has a partial double web configuration.

Referring now to FIG. 4 of the drawings I-beam 36" is shown which includes double web portion 56 that defines double web channel 58 at space 60 of plate 40. I-beam 36" is preferably formed of extruded aluminum or glass filled nylon. In some applications it may be desirable to construct I-beam 36" with two double web potions, i.e. one in association with each plate 38,40. Again, other than the geometry of I-beam 36", the reinforced beam of FIG. 3 is made in accordance with the description provided for FIGS. 1 and 2 herein.

FIG. 4 may be considered as illustrating the I-beam 36" to be in the form of a spanning member having a central leg to which continuous plate or carrier member 38 is integrally mounted. The spanning member also has two offset legs each of which supports a segment of the plate or carrier member 40 so that the resultant carrier member 40 is of interrupted structure. The adhesive layer 50 may be confined to each plate segment 40 and upon activation the adhesive would span across the plate segments when becoming intimately bonded to bottom area 32 of the structural member 40. Alternatively if the adhesive layer 50 has sufficient shape retaining properties, the layer 50 may be applied to each plate segment and also span across the space between the segments before activation.

Figure 5:
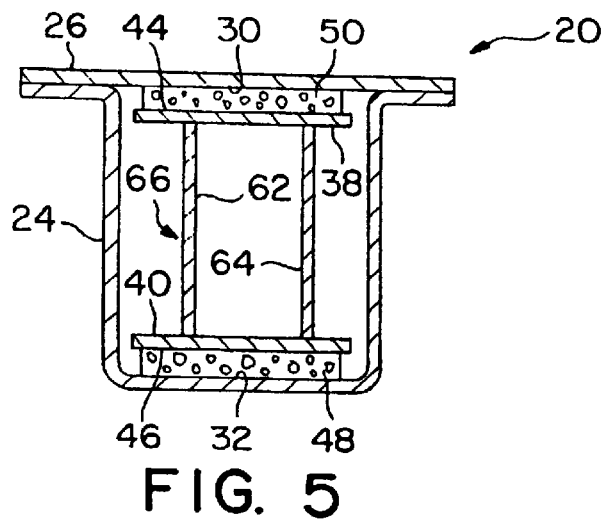
FIG. 5 is a cross section of a reinforced beam in accordance with the present invention in which the reinforcing insert has a full double web configuration.
Figure 6:
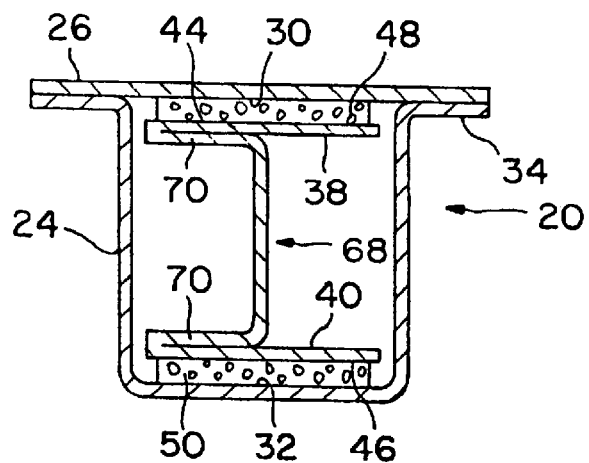
FIG. 6 is a cross section of a reinforced beam in accordance with the present invention in which the reinforcing insert has an I-beam configuration constructed as a dual fold structure.

In FIG. 5 webs 62 and 64 form a web pair in double web reinforcing insert 66. Double web insert 66 is preferably formed of extruded aluminum or glass filled invention. Webs 62 and 64 preferable extend the entire length of double web reinforcing insert 66. In FIG. 6 of the drawings still another configuration of the present invention is shown in which folded reinforcing insert 68 has fold regions 70. Folded reinforcing insert 68 is roll formed metal.

Figure 7:
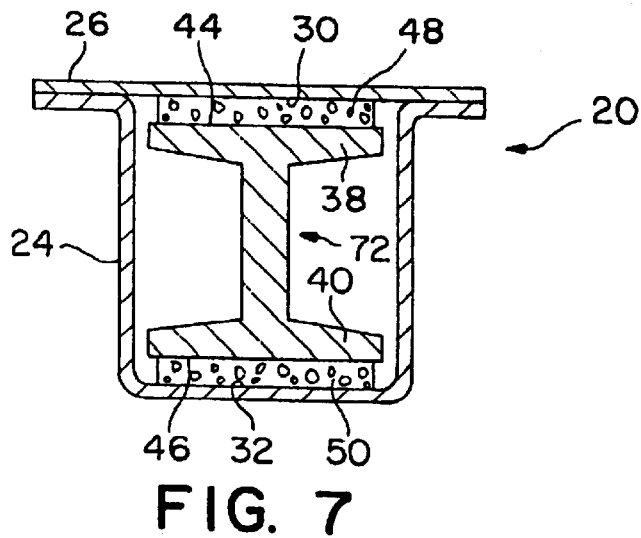
FIG. 7 a cross section of a reinforced beam in accordance with the present invention in which the reinforcing inset has an I beam configuration wherein the I-beam is a cast cementitious structure.

Referring now to FIG. 7 of the drawings, I-beam 72 is shown which is formed by casting a foam cement material. More specifically, it has been found that a Portland cement-based I-beam 72 is desirable for use in the present invention. The Portland cement-based material has a combination of microspheres or cement, water and silica fume.

In the following tables, preferred formulations for the cement-water based mixes for I-beam 72 are set forth.

| INGREDIENT | FORMULA I (STANDARD MIX) (PARTS BY WEIGHT) | FORMULA II (LIGHTWEIGHT MIX) (PARTS BY WEIGHT) |
| --- | --- | --- |
| Cement | 54% | 54% |
| Water | 24% | 24% |
| Density Dry Cement Mix | 40 PCF | 40 PCF |
| Density Wet Cement Mix | 56 PCF | 40 PCF |

The standard mix is made with an equal volume of cement. Portland Type IA or Type I as defined in the book of the Portland Cement Association entitled "Design and Control of Concrete Mixtures" Eleventh Edition (Library of Congress catalog card number 29-10592) and an equal volume of microspheres.

The bulk of the density of the Portland Type I A cement is approximately 75 to 30 pounds per cubic feet. The bulk density of the microspheres is 15 pounds per cubic feet. By combining the two in equal amounts the specific gravity of the combined mix dry is 25 to 40 pounds per cubic feet of approximately one half the weight of the cement.

The amount of water added to the mix is between 35 to 50 percent of the weight of the cement. Thus, if the mix has 800 grams of cement 400 grams of water would be added. The mix has 220 to 650 grams of the microspheres.

The Portland Cement/microspheres combination is improved in its moisture resistance characteristic by the addition of silica fume. Silica fume is a dust material collected from flu gas stacks. The silica dust are tiny inert particles, typically about 15 microns in diameter. When the silica inert particles are added to the dry cement mix, the particles clog the interstitial spaces between the cement particles and the microspheres. The silica fume particles clog the pores between the cement and thereby vastly improve the moisture resistance of the cured product. The amount of silica fume added is preferably from about 10 to 20 percent by weight of cement.

There are two versions of silica fume, one treated and the other one not treated. The treated silica fume has a plasticizer which also lubricates the mix and reduces the water content further.

To increase the moisture resistance of the finished product other materials can be used in place of the silica fume. These are water born materials such as a latex manufactured by Dow Chemical Co. of Midland Mich., or a water base urethane. acrylic, or epoxy. Such materials have the characteristic of clotting the inner spaces between the cement particles. Silica fume will actually combine chemically with the cement and will improve the properties of the cement. The latex does not chemically combine with the cement, but it can be used to clot the cement pores and thereby reduce the water to cement ratio. The water base urethane, acrylic and epoxies produce the same result of clotting as a latex or silica fume.

While particular embodiments of this invention are shown and described herein, it will be understood, of course that the invention is not to be limited thereto since many modifications may be made, particularly by those skilled in this art, in light of this disclosure. It is contemplated therefore by the appended claims, to cover any such modifications as fall within the true spirit and scope of this invention. Thus, although the invention has been described with particular reference to reinforcing automotive parts, the invention may be practiced for reinforcing other parts. Examples of such other parts are aircraft, furniture, appliances and farm equipment. Still other parts will be apparent to those of ordinary skill in the art, given the teachings of the invention.

What is claimed is:

1. An insert for reinforcing a hollow structural member having at least two spaced walls, said insert comprising two opposed carrier members spaced from each other, a spanning member interconnecting said carrier members for disposing each of said carrier members at a respective one of the spaced walls of the structural member when said insert is placed on the hollow structural member, each of said carrier members having an outer principal surface, an expandable adhesive body disposed on each of said principal surfaces, each of said adhesive bodies being made of a material which forms a structural foam upon curing and expansion, and each of said adhesive bodies being intimately bonded to its said carrier member whereby upon expansion said adhesive body may become intimately bonded to a wall of the structural member to create a reinforcement which is bonded to the spaced walls of the structural members and to span the spacing between the walls.

2. The insert of claim 1 wherein said material of said adhesive bodies has vibration damping characteristics upon expansion.

3. The insert of claim 2 wherein said material of said adhesive bodies has a melting point and a heat distortion temperature, and a temperature at which chemical breakdown occurs which is sufficiently high to maintain its structure at a temperature of at least 130 degrees F.

4. The insert of claim 3 wherein said material of said adhesive bodies is heat expandable and maintains its structure at a temperature of at least 350 degrees F.

5. The insert of claim 4 wherein said material maintains its structure at a temperature of at least 400 degrees F.

6. The insert of claim 3 wherein said material is heat expandable.

7. The insert of claim 3 wherein said carrier members and said spanning member are made of metal.

8. The insert of claim 7 wherein said metal is steel.

9. The insert of claim 7 wherein said carrier members and said spanning member form an I-beam shape.

10. The insert of claim 9 wherein said carrier members and said spanning member are integrally connected to form a one-piece I-beam.

11. The insert of claim 9 wherein said I-beam shape is formed by back to back squared C-members.

12. The insert of claim 9 wherein said I-beam shape comprises one of said carrier members being a continuous carrier member and the other of said carrier members being an interrupted carrier member, said spanning member having a central leg which is connected to said continuous carrier member, and a pair of offset legs extending from said central leg and connected to said interrupted carrier member.

13. The insert of claim 9 wherein said spanning member comprises a plurality of spaced webs.

14. The insert of claim 9 wherein said carrier member and said spanning member are formed from a single piece which is folded upon itself to form said I-beam shape, and a portion of each of said carrier members being of double thickness than the remaining portion.

15. The insert of claim 9 wherein said I-beam shape is formed from casting a foam cement material.

16. The insert of claim 1 wherein said carrier members and said spanning member are made of metal.

17. The insert of claim 1 wherein said carrier members and said spanning member form an I-beam shape.

18. The insert of claim 17 wherein said I-beam shape is formed by back to back squared C-members.

19. The insert of claim 17 wherein said I-beam shape comprises one of said carrier members being a continuous carrier member and the other of said carrier members being an interrupted carrier member, said spanning member having a central leg which is connected to said continuous carrier member, and a pair of off-set legs extending from said central leg and connected to said interrupted carrier member.

20. The insert of claim 17 wherein said spanning member comprises a plurality of spaced webs.

21. The insert of claim 17 wherein said carrier member and said spanning member are formed from a single piece which is folded upon itself to form said I-beam shape, and a portion of each of said carrier members being of double thickness than the remaining portion.

22. The insert of claim 17 wherein said I-beam shape is formed from casting a foam cement material.

23. The insert of claim 17 wherein said carrier members and said spanning member are made of a metal material.

24. The insert of claim 1 wherein said material of said adhesive bodies is comprised of a synthetic resin, a cell-forming agent and a filler.

25. The insert of claim 24 wherein said synthetic resin is an epoxy resin.

26. The insert of claim 24 wherein hollow glass microspheres comprise said cell-forming agent.

27. The insert of claim 24 wherein a chemical blowing agent comprises said cell-forming agent.

28. The insert of claim 1 wherein said material of said adhesive bodies is comprised of from about 50 to about 80 percent by weight epoxy resin, from about 10 to about 40 percent by weight hollow glass microspheres, from about 10 to about 400 microns in diameter, and from about 1 to about 10 percent by weight chemical blowing agent.

29. The insert of claim 28 wherein said material is additionally comprised of an accelerator, curing agent, or a combination thereof.

30. The insert of claim 28 wherein said material is additionally comprised of one or more fillers selected from the group consisting of glass microspheres other than hollow glass microspheres, plastic microspheres, silica fume, calcium carbonate, milled glass fiber, and chopped glass strand.

31. The insert of claim 1 wherein the adhesive bodies are pre-formed as ribbons or sheets and cut to length.

32. The insert of claim 1 wherein the adhesive bodies have sufficient tack to adhere well to said principal surfaces without use of an additional adhesive.

33. The insert of claim 1 wherein the adhesive bodies expand when heated by about 50 to about 100 percent by volume.

34. A reinforced structural member, comprising: a structural member having a plurality of walls with a channel shaped inner surface formed by said walls to define a space, a reinforcing beam disposed in said space, said reinforcing beam being of differing shape than the shape of said channel shaped inner surface, said reinforcing beam being non-uniformly spaced from said channel shaped inner surface, said reinforcing beam being of generally I shape having two opposed plates, each of said plates having a principal surface, said plates being separated from each other, said plates being interconnected by an interconnecting structural spacing element, each of said principal surfaces terminating in an outer edge located outwardly of said interconnecting structural spacing element whereby a portion of each of said principal surfaces is on each side of said interconnecting structural spacing element, a first expanded structural foam adhesive body disposed on one of said principal surfaces and a second expanded structural foam adhesive body disposed on the other of said principal surfaces spaced from said first adhesive body; said first expanded structural foam adhesive body being bonded to one of said walls of said structural members and said second expanded structural foam adhesive body being bonded to another of said walls of said structural member for reinforcing said structural member, and open spaces in said structural member between said inner surface and said reinforcing beam.

35. The reinforced structural member recited in claim 34, wherein portions of at least one of said plates is non-coplanar with other portions of said at least one of said plates.

36. The reinforced structural member recited in claim 34, wherein said first and said second adhesive bodies are the sole connection of said beam to said structural member.

37. The reinforced structural member recited in claim 34, wherein said plates are planar and parallel to each other.

38. The reinforced structural member recited in claim 34, wherein said structural member is made of metal.

39. The reinforced structural member recited in claim 34, wherein said first and said second adhesive bodies are thermally expandable.

40. The reinforced structural member recited in claim 34, wherein said principal surfaces of said reinforcing beam are co-extensive with said reinforcing beam.

41. The reinforced structural member recited in claim 34, wherein said first and second adhesive bodies cover substantially the entirety of said principal surfaces.

42. The reinforced structural member recited in claim 34, wherein said adhesive bodies comprise planar ribbons of thermally expanded adhesive.

43. The reinforced structural member recited in claim 34, wherein said reinforcing beam is roll formed metal.

44. The reinforced structural member recited in claim 34, wherein said interconnecting structural spacing element of said reinforcing beam is a c-shaped structure defining a channel.

45. The reinforced structural member recited in claim 34, wherein said reinforcing beam is a pair of mated c-shaped channels which are connected to one another to form said I shape.

46. The reinforced structural member recited in claim 34, wherein at least one of said principal surfaces is discontinuous such that a longitudinal space is formed therein.

47. The reinforced structural member recited in claim 46, wherein said interconnecting structural spacing element defines a pair of parallel opposed linear walls which form a bridge at said longitudinal space.

48. The reinforced structural member recited in claim 34, wherein said interconnecting structural spacing element is a pair of parallel side walls.

49. The reinforced structural member recited in claim 34, wherein said reinforcing beam is extruded aluminum.

50. The reinforced structural member recited in claim 30, wherein said adhesive bodies are limited to said principal surfaces.

51. The reinforced structural member recited in claim 34, wherein said adhesive bodies include a two part air-cured adhesive.

52. The reinforced structural member recited in claim 34, wherein said adhesive bodies are one part adhesive.

53. The reinforced structural member recited in claim 34, wherein said beam is glass filled nylon.

54. The reinforced structural member recited in claim 34, wherein said beam is a cast cement-based material.

55. An insert for reinforcing a hollow structural member comprising a reinforcing beam of generally I shape, said reinforcing beam having two opposed plates, each of said plates having a principal surface, said plates being separated from each other, said plates being interconnected by an interconnecting structural spacing element, each of said principal surfaces terminating in an outer edge located outwardly of said interconnecting structural spacing element whereby a portion of each of said principal surfaces is on each side of said interconnecting structural spacing element, a first expandable adhesive body disposed on one of said principal surfaces, a second expandable adhesive body disposed on the other of said principal surfaces spaced from said first adhesive body, and portions of at least one of said plates being non-coplanar with other portions of said at least one of said plates.

56. The insert recited in claim 55, wherein said principal surface of said at least one of said plates is discontinuous such that a longitudinal space is formed therein.

57. The insert recited in claim 56, wherein said interconnecting structural spacing element defines a pair of parallel opposed linear walls which form a bridge at said longitudinal space.

58. The insert recited in claim 55, wherein said adhesive bodies are thermally expandable.

* * * * *